United States Patent [19]
Forney et al.

[11] Patent Number: 5,512,312
[45] Date of Patent: Apr. 30, 1996

[54] RADIANT WALL OVEN AND METHOD OF USING THE SAME

[76] Inventors: Robert B. Forney, P.O. Box AI, Tiburon, Calif. 94920; Ernest C. Brown, 19 Ledgewood Dr., Danvers, Mass. 01923

[21] Appl. No.: 356,835

[22] Filed: Dec. 14, 1994

Related U.S. Application Data

[63] Continuation-in-part of Ser. No. 260,967, Jun. 15, 1994, abandoned.

[51] Int. Cl.⁶ .............................. A23L 1/00; A47J 27/00; H05B 6/00
[52] U.S. Cl. .................. 426/523; 99/386; 99/443 C; 99/451; 126/20; 126/273.5; 219/700; 426/510; 426/243
[58] Field of Search .................................. 426/523, 243, 426/510; 99/386, 443 C, 451, DIG. 14; 126/19, 20, 21 R, 273.5; 219/700, 701

[56] References Cited

U.S. PATENT DOCUMENTS

| | | | |
|---|---|---|---|
| 2,529,253 | 11/1950 | Hoffman et al. | 99/386 |
| 3,721,178 | 3/1973 | Szabrak et al. | 99/386 |
| 3,908,533 | 9/1975 | Fagerstrom et al. | 99/386 |
| 4,023,007 | 5/1977 | Brown | 99/386 |
| 4,121,509 | 10/1978 | Baker et al. | 99/386 |
| 4,254,697 | 3/1981 | Lang-Ree et al. | 99/443 C |
| 4,383,823 | 5/1983 | Williams et al. | 99/386 |
| 4,448,117 | 5/1984 | Wells | 99/386 |
| 4,473,004 | 9/1984 | Wells et al. | 99/386 |
| 4,569,658 | 2/1986 | Wiggins et al. | 99/443 C |
| 4,591,333 | 5/1986 | Henke | 99/386 |
| 4,737,373 | 4/1988 | Forney | 426/523 |
| 4,834,063 | 5/1989 | Hwang et al. | 99/443 R |
| 4,876,426 | 10/1989 | Smith | 426/523 |
| 4,884,552 | 12/1989 | Wells et al. | 99/386 |
| 4,936,286 | 6/1990 | Baker | 99/386 |

*Primary Examiner*—George Yeung
*Attorney, Agent, or Firm*—Thomas M. Freiburger

[57] ABSTRACT

An oven for cooking and browning foods has heated, radiant walls. Heat may be supplied by a gas burner flame in a plenum behind the walls, with products of combustion thus being isolated from the food in the oven chamber. In one embodiment food products are continuously conveyed through the oven chamber and are either cooked or simply browned in the oven by the radiant wall heat. Fats and other materials rendered from the food products, if not fully incinerated in the oven chamber, may be transferred along with exhaust air from the oven chamber to a separate combustion chamber, for incineration. Steam or other inert gas is introduced to the oven chamber to minimize oxidation and prevent flame. An alternative wall heating system uses electric resistance heat elements inside a thin ceramic wall. In another embodiment a web-like metal conveyor of a radiant wall oven is returned through the oven in order to heat the conveyor sufficiently to put grill stripes on a product being browned, such as meat. Water spray or other means are included for controlling the temperature of the belt to a desired range. In a further embodiment a radiant wall oven is combined in series with a microwave oven, so that the food products are browned in the radiant wall oven and cooked in the microwave oven.

53 Claims, 6 Drawing Sheets

RADIANT WALL OVEN AND METHOD OF USING THE SAME

The application is a continuation-in-part of application Ser. No. 260,967, filed Jun. 15, 1994, now abandoned.

BACKGROUND OF THE INVENTION

This invention is in the field of cooking of foods, and more specifically the invention is concerned with browning and cooking of foods in such a way as to avoid the exhausting to the atmosphere of objectionable smoke and gases from rendered fats and other products, and in a fast and efficient manner which greatly reduces space requirements as well as cleaning requirements. The invention is also concerned with reclaiming of heat from various processes including both cooking and incineration of rendered fats and oils, for use in other processes associated with the system.

Cooking systems, including commercial ovens, often have a problem with exhausting of gases and smoke particles from rendered fats, oils and other materials emanating from the cooked food product. Environmental regulations have required scrubbers or smoke afterburners associated with exhaust stacks, to make the gases and remaining particles suitable for introduction to the atmosphere.

Radiant heat in ovens is well known and has been used both commercially and in home ovens. Calrod and gas infra-red heaters are often used as cooking elements.

A cooking and browning system is described in Forney U.S. Pat. No. 4,737,373. High temperature, high velocity air is used in an oven to brown a meat, poultry or other food product; separately, before or after the browning step, the food product is cooked at a lower temperature and more slowly, such as in a steam oven on a continuous flow basis. Steam for the slow cook is generated by using exhausted hot air from the browning oven as a source of heat.

Various types of cooking and/or browning ovens are shown in the following U.S. Pat. Nos.: Hoffman et al. 2,529,253, Szabrak et al. 3,721,178, Fagerstrom et al. 3,908,533, Brown 4,023,007, Baker et al. 4,121,509, Lang-Ree et al. 4,254,697, Williams 4,383,823, Wells 4,448,117, Wells et al. 4,473,004, Wigging et al. 4,569,658, Henke 4,591,333, Hwang et al. 4,834,063, Wells et al. 4,884,552 and Baker 4,936,286.

Of the above patents, Wells U.S. Pat. No. 4,473,004 discloses a tunnel-type oven which utilizes radiant heat generated from combustion of gas circulated in a closed cylindrical chamber surrounding a food product conveyor, so as to cook products as they advance on the conveyor through the tunnel oven (see particularly FIG. 16). This patent mentions the use of wall temperatures in the range of 1000° to 1200° F. or higher. Because of this high temperature, the patent states that the disclosed ovens can be self-cleaning, with rendered grease droppings, food residue and other food material reduced to ash. The patent also suggests the desirability of avoiding direct flame contact with food products, to prevent the generation of carcinogens.

Wells U.S. Pat. No. 4,884,552 discloses another form of gas-fired tunnel oven.

The Wigging patent describes a tunnel oven of the convective type in which off gases from cooking are directed through a heat exchanger for heat exchange with ambient air before being circulated into the oven, and the patent mentions an increase in efficiency of the oven due to this heat exchange.

A problem with many commercial ovens, and even domestic cooking facilities, is the direct exposure of products of combustion to the food product being cooked, whether the food contact is by a direct open flame (recognized by Wells to be undesirable) or by gases produced by combustion. This can introduce carcinogens and other undesirable substances into food for human consumption.

None of the above patents has disclosed an oven for cooking and/or browning with the advantages of low emissions and efficiently controlled cooking, in an oxygen-deficient oven atmosphere as in the invention described below.

SUMMARY OF THE INVENTION

In accordance with this invention, an oven has radiant walls behind which is a plenum or plena within which heating of the walls occurs. The walls may in this way be heated to a high temperature, e.g. about 1200° to 1500° F., for surface browning of meats, poultry, fish, etc. At this high wall temperature (one preferred operating wall temperature is about 1450° F.), and with a low-oxygen atmosphere in the oven, it is found that rendered fats and oils are "incinerated" (reduced to ash) without flame, to the point that the oven exhaust is very clean and generally will not need further treatment. The term "incineration" as used herein is intended to mean vaporization or consumption of such rendered materials, without air in the oven but preferably with air in a separate combustion chamber, if used. The radiant walls could be above and below the food product, left and right of the food product, or both, but in a preferred embodiment the wall is continuous in transverse cross section, being cylindrical, i.e. circular/cylindrical or elliptical/cylindrical.

It is found that the exhaust from the oven is at a fairly low temperature, lower than the wall temperature. The cooking is radiant and not convective, thus the atmosphere is not heated to a temperature the same as that of the walls.

Inert gases other than steam can be used in the oven chamber if desired.

In a simple, static form of the oven it can include an openable door, for batch cooking/browning of foods; in a commercial embodiment the oven can include a conveyor continuously moving food products through the oven chamber.

Thus, it is an important feature of the invention that the products of combustion are not exposed to the food in the oven chamber. This enables the use of various fuels, including "dirtier" fuels as regards substances dangerous for human consumption, since these fuels and their products of combustion are always isolated by the oven walls from the food products being cooked or browned. In addition to natural gas, other fuels such as oil, butane, diesel fuel, kerosene, gasoline or other petroleum-based fuels may be used, as well as solid fuels such as pulverized wood and coal.

In an alternative embodiment, a radiant wall oven comprises a ceramic shell with embedded electric resistance elements, insulated around the outside, avoiding the need for a plenum.

The radiant wall oven of the invention, in this same form or in another form, can be used at a lower wall temperature to cook products more thoroughly and more slowly. At approximately 300° to 800° as a wall temperature the oven will cook products over a longer period (depending on makeup, shape and weight of the product), and this may be accomplished commercially using a conveyor continuously moving through the oven chamber. In this case, meats, poultry and other fatty products will give off rendered fats and oils into the oven atmosphere, and again the low-oxygen atmosphere in the oven chamber prevents these rendered products from flaming in the oven. However, these rendered products enter the oven atmosphere (not incinerated at this range of temperature) and as exhausted out of the oven normally cannot be introduced directly into the atmosphere. An afterburning or incineration of these products is required. Therefore, in an embodiment of the invention an incinerating combustion chamber is provided separate from the oven chamber.

Exhaust gases, rendered fats and oils, etc. from the oven atmosphere of the full cooking oven are continually withdrawn (as by hoods at the entry and exit to the oven chamber) and are directed into the combustion chamber. En route to the combustion chamber these gases, oils and smoky products preferably are preheated, using exhaust heat from the oven heating plenum (behind the walls) in heat exchange with the oven atmosphere gases. The plenum exhaust temperature will be slightly lower than the oven wall temperature (depending on efficiency of heat transfer to the walls), but will be sufficient to appreciably elevate the temperature of the oven gas and smoke products. The plenum preferably is exhausted as slowly as possible, just sufficient to maintain gas combustion in the plenum by introduction of new makeup air.

In the incinerator or combustion chamber is a burner which fully combusts these cooking products with air introduced. Incineration temperature should generally be above 1200° F., more preferably at about 1400° to 1500° F. The hot gases resulting from this incineration can then be introduced back to the plenum or plena which are directly behind the walls of the oven chamber as primary heat for the plenum. These gases entering the heat plenum will still be very high, typically above 1400° F., and will supply much heat to the radiant walls of the oven, often sufficient to operate the oven. The flow volume of these hot gases through the plenum can be varied as needed, and can be reduced at times they would tend to overheat the walls beyond the desired wall temperature. However, additional heat from a gas flame may be required to maintain the desired temperature, and may be activated intermittently.

From the plenum, gases can be exhausted to the atmosphere, and as noted above, they are preferably first used through heat exchange to preheat the oven exhaust gases and smoke prior to incineration. In addition they may be used to generate steam for introduction to the oven to create a low-oxygen or no-oxygen atmosphere. The heat from the plenum exhaust could also be used in exchange with makeup air for the plenum, to preheat that air.

With the oven used at lower, full-cook temperatures as described, the oven chamber will become dirty. However, the gas burner or burners in the plenum are available to heat the oven to high temperature (1200° to 1500° F.) for self cleaning periodically, as needed.

It is assumed herein that the term "cooking" includes full cooking as well as merely browning an outer layer of a food product, even though the terms "cooking" and "browning" are often used together or in the alternative. Browning is a form of cooking.

Summarizing one form of the present invention, a method for cooking a food product includes placing the food product in an oven chamber having heated, radiant walls, with the food product spaced from the walls. The radiant walls are maintained at temperature between about 1400° F. and 1500° F. The method includes retaining the food product in the oven chamber, subjected to the heat from the radiant walls, for a dwell time sufficient to brown the surfaces of the food product but not to burn the surfaces. An oxygen-deficient atmosphere is introduced into and maintained in the oven chamber, sufficiently low in oxygen that the food product does not flame while in the oven chamber.

The food product generally will be surface-browned only using this high temperature procedure, and will have a dwell time in the oven which is short, for example about 30 seconds. Full cooking will be achieved by a separate process. However, if the food product is sufficiently thin, such as very thin hamburger patties, for example, they can be cooked sufficiently for consumption, as well as browned, during this high temperature dwell.

A cooking stage, used in combination with the radiant wall oven of the invention, can comprise conventional convection cooking, steam cooking, cooking in accordance with Forney U.S. Pat. No. 4,737,373 or other types of conventional cooking. In accordance with one preferred embodiment of the invention, the cooking step is accomplished in a microwave oven. This has the advantage of greatly reduced floor space and cleaning and sanitation costs, and it cooperates with the radiant wall oven of the invention in that both processes create little or no smoky exhaust. Browning is preferably, but not necessarily, accomplished first. The combination of radiant wall browning and microwave cooking has the advantages of (1) very good control of cooking and browning, (2) very fast cooking/browning, (3) very low space requirements, (4) excellent cleaning characteristics of both ovens, almost eliminating cleaning labor, down time and chemicals, and (5) virtually no smoky exhaust from either process, avoiding the need for exhaust scrubbers even in densely populated areas.

In one embodiment of the invention a commercial, conveyorized oven has two stages: a browning stage and a full cooking stage, along a single conveyor path. Rendered materials, smoke and gases from the cooking area can be drawn through the browning oven to be incinerated prior to exhausting.

The invention also encompasses the radiant wall oven itself, which includes a housing defining the oven chamber with walls, at least one wall having behind it a hot gas chamber or plenum to heat the wall and to impart radiant energy into the oven chamber, or the wall being ceramic with encased resistance elements. Preferably the oven wall is continuous peripherally around the oven chamber, and may be shaped as a cylinder. A flame retardant means is included for introducing an oxygen-starved atmosphere into the oven chamber, preventing flaming of food products when cooked and/or browned in the oven chamber. Exhaust means are included for continuously withdrawing oven gases from the oven chamber during cooking of food products. Separate exhaust is also provided from the hot gas chamber.

It is therefore among the purposes and objects of the invention to provide an oven which will cook and/or brown a food product by radiant heat energy emanating from the walls of the oven, the oven chamber being isolated from any products of combustion which provide the heat, and to prevent flaming in the oven chamber by introducing a low-oxygen atmosphere. A related object is to provide a clean exhaust from the cooking process, by complete incineration of cooking by-products within the oven itself or via a separate afterburner or combustion chamber, with conservation of heat energy by preheating oven gases before incineration and preferably using some of the combustion heat to generate steam for the reduction atmosphere. The radiant wall oven in connection with an adjacent microwave oven has the advantage of greatly reduced space requirements, fast, ideal cooking and browning, and avoidance of oven cleaning and objectionable exhaust gases. These and other objects, advantages and features of the invention will be apparent from the following description of a preferred embodiment, considered along with the accompanying drawings.

DESCRIPTION OF PREFERRED EMBODIMENTS

Figure 1:
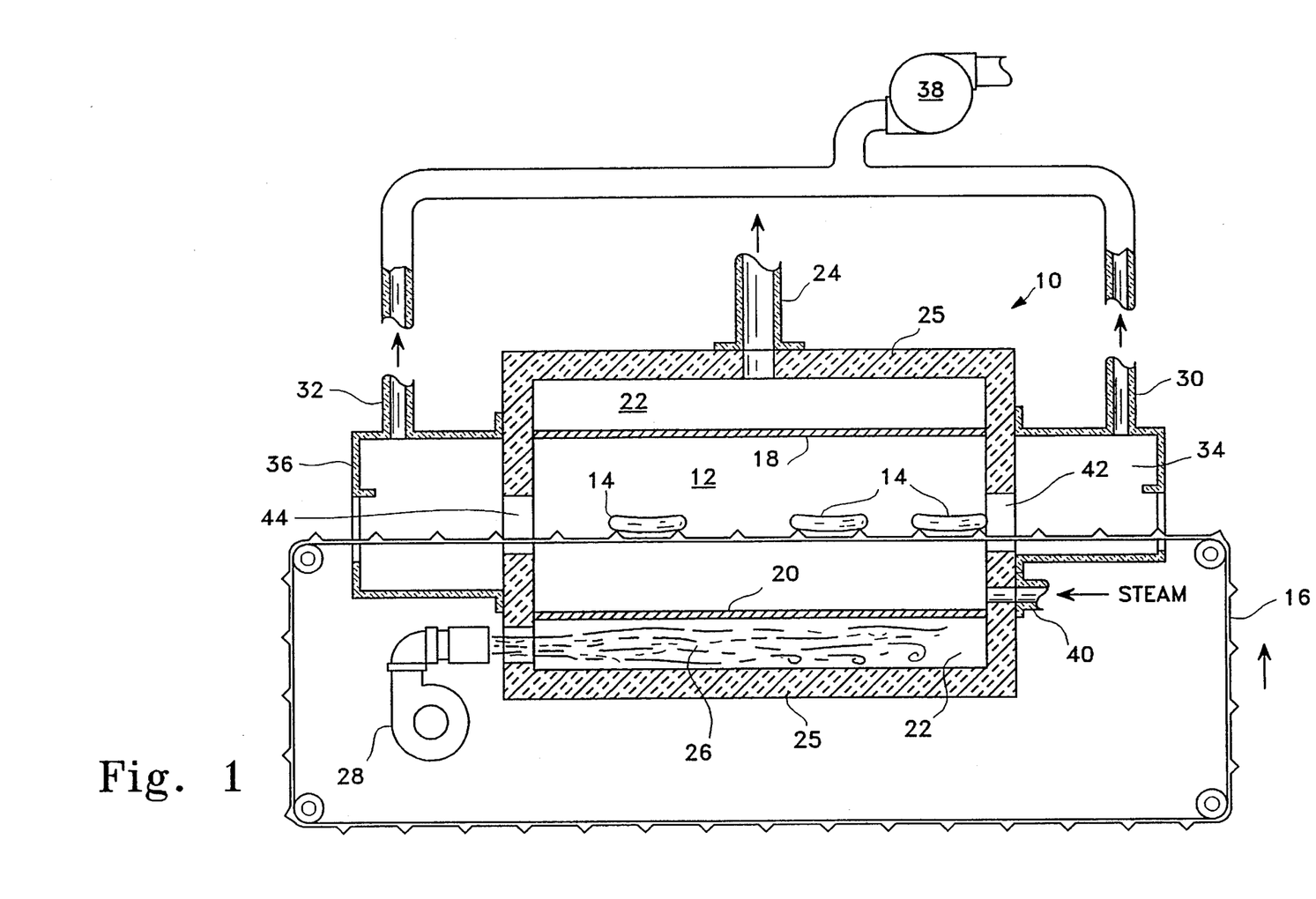
FIG. 1 is a schematic view representing a radiant wall oven in elevational cross section in accordance with the invention.

In the drawings, FIG. 1 shows schematically a radiant wall oven 10 having an internal oven chamber 12 for cooking and/or browning of food products 14 inside the chamber (the term "cooking" includes browning). In the embodiment illustrated, a conveyor 16 is shown for continuously moving food products through the oven. However, it should be understood that in a simpler form of the invention the oven can be a static oven, wherein foods are cooked in a batch procedure, i.e. loaded into the oven and removed after a cooking/browning cycle, as shown in the modified embodiment of FIG. 3.

In the embodiment illustrated in FIG. 1, the oven chamber 12 has radiant walls shown at 18 and 20 above and below the food products. These radiant walls, which are heated to a high temperature, can comprise upper and lower separate walls (preferably arch-shaped around the path of the conveyor), but in a preferred embodiment they comprise one continuous wall extending peripherally around and defining the boundaries of the oven chamber 12. The chamber wall may be circular-cylindrical or elliptical-cylindrical (long dimension horizontal), for example. The oven chamber wall may be formed of stainless steel or other special metal alloy having high-temperature (e.g. 1700°–1800° F.) capability. These walls 18 and 20 are heated via a heat plenum 22 shown above and below the walls, preferably comprising a single plenum surrounding the chamber wall 18, 20, exhausted as indicated at 24 in the drawing, i.e. a plenum exhaust at the top of the unit. Insulation 25 is indicated as surrounding the plenum 22, and this may be similar to insulation described below.

The heat plenum 22 is heated by combustion of gas producing a flame 26 from a burner 28 as shown. As noted earlier, the oven chamber of the invention most preferably is of a cylindrical internal shape, or an elliptical shape, flatter at top and bottom. In this way, the radiant surfaces completely surround the food product being cooked or browned. It has been found that a single gas burner in the plenum, with the flame positioned below the cylindrical oven wall (which may be stainless steel or other high-temperature metal alloy), will have the effect of spreading the flame and hot gases up around the circular or elliptical cylinder defining the oven chamber, so that the entire cylindrical wall is quickly heated to a glowing state. The spreading of this heat in the chamber wall is assisted by cross-radiation in the oven chamber and by conduction through the metal, as well as by the natural path of the flame and hot gases up around the exterior of the cylinder toward upper vent 24. In a longer oven more than one gas burner 28 may be needed, positioned below the wall cylinder in the plenum and spaced along the length of the plenum. A single burner of about 50,000 BTU capacity has been found adequate for the purposes described herein in an oven chamber of the type generally shown in FIG. 1, with the oven chamber being about 2½ feet in length and about 15 inches in internal diameter.

For best efficiency in directing the flame and hot gases to spread the heat as desired around the oven chamber wall, the insulating blanket 25 surrounding the plenum preferably also has a cylindrical shape, leaving a generally toroidal space surrounding the oven chamber, as the plenum. This insulation may be fire brick, ceramic insulation such as "FiberFrax" (trademark) or other high temperature insulation which can stand temperatures at least as high as about 1700° to 1800° F., preferably up to about 2000° F. or more.

The diagram of FIG. 1 also shows vents 30 and 32 positioned to draw off gases, as well as any smoke present, from the oven chamber on a continuous basis. Each vent 30, 32 has a hood or vestibule 34, 36 for collection of gases with negative pressure, i.e. a fan or suction unit 38 is connected to these vents, preferably a common fan unit for both vents as schematically indicated.

The diagram also indicates steam being injected at 40 into the oven chamber. The introduction of steam is an important feature of the process and system of the invention, since the steam establishes an oxygen-starved atmosphere, with little or no oxygen to support any combustion within the chamber 12. Therefore, even with the radiant walls 18 and 20 operated in a preferred temperature range of about 1000° to 1500° F., more preferably about1450° F., no flaming of rendered oils, fats or dropped crumbs or food particles will occur in the oven chamber. The steam is preferably introduced in such a way, and is so related to the withdrawal draft from the vents 30 and 32, as to establish a very slightly positive pressure within the oven chamber. Thus, steam and exhaust gases are always being pushed out of the oven chamber, without the opportunity for air in any significant quantity to enter through the two oven openings (entrance and exit) 42 and 44.

Thus, in the illustrated embodiment of the invention, any rendered fats, oils or other particles which would be considered pollutants and should not be exhausted to atmosphere are essentially "incinerated" within the oven chamber. The oven chamber can be vented directly to the outside atmosphere. Generally a strong reddish glow is observable in the area immediately surrounding the food products, particularly those containing fats and oils, but no open flame is observed. Were it not for the low-oxygen atmosphere in the oven chamber, there would be high-temperature combustion of rendered materials from food products, and the surfaces of the products would be badly burned.

The oven shown in FIG. 1, as well as the static oven described as an alternative, operate at the high temperatures referenced above. This is the temperature of the radiant walls, needed to effectively brown the exterior surfaces of the food products in a very short time (e.g. about 20 to 35 seconds) and to incinerate by-products of cooking. For certain food products, such as very thin meat patties as noted above, a full cook can sometimes be accomplished using this oven at the prescribed temperature. However, most foods, particularly most meats or poultry or other foods containing fats and oils, will typically be cooked at a lower temperature such as in a conventional oven or an oven of the type described, for example, in Forney U.S. Pat. No. 4,737,373.

The oven 10 does not produce an extremely hot exhaust at the venting vestibules 34 and 36. Even though the walls preferably are at about 1450° F. in the high-temperature use of the oven, the exhausted gases from the oven cooking chamber are cooler. Also, as noted above, the plenum exhaust temperature is slightly lower than the wall temperature—this exhaust temperature depends on efficiency of heat transfer to the wall, but is slightly lower than the radiant wall temperature.

Again, a unit of the type generally shown in FIG. 1 can comprise a closed oven chamber, with a door for loading of food products and later removal of the cooked or browned products. The chamber will still be vented to the atmosphere and the oven atmosphere will again be an oxygen-deficient atmosphere, preferably with steam introduced during a cooking/browning cycle.

Figure 3:
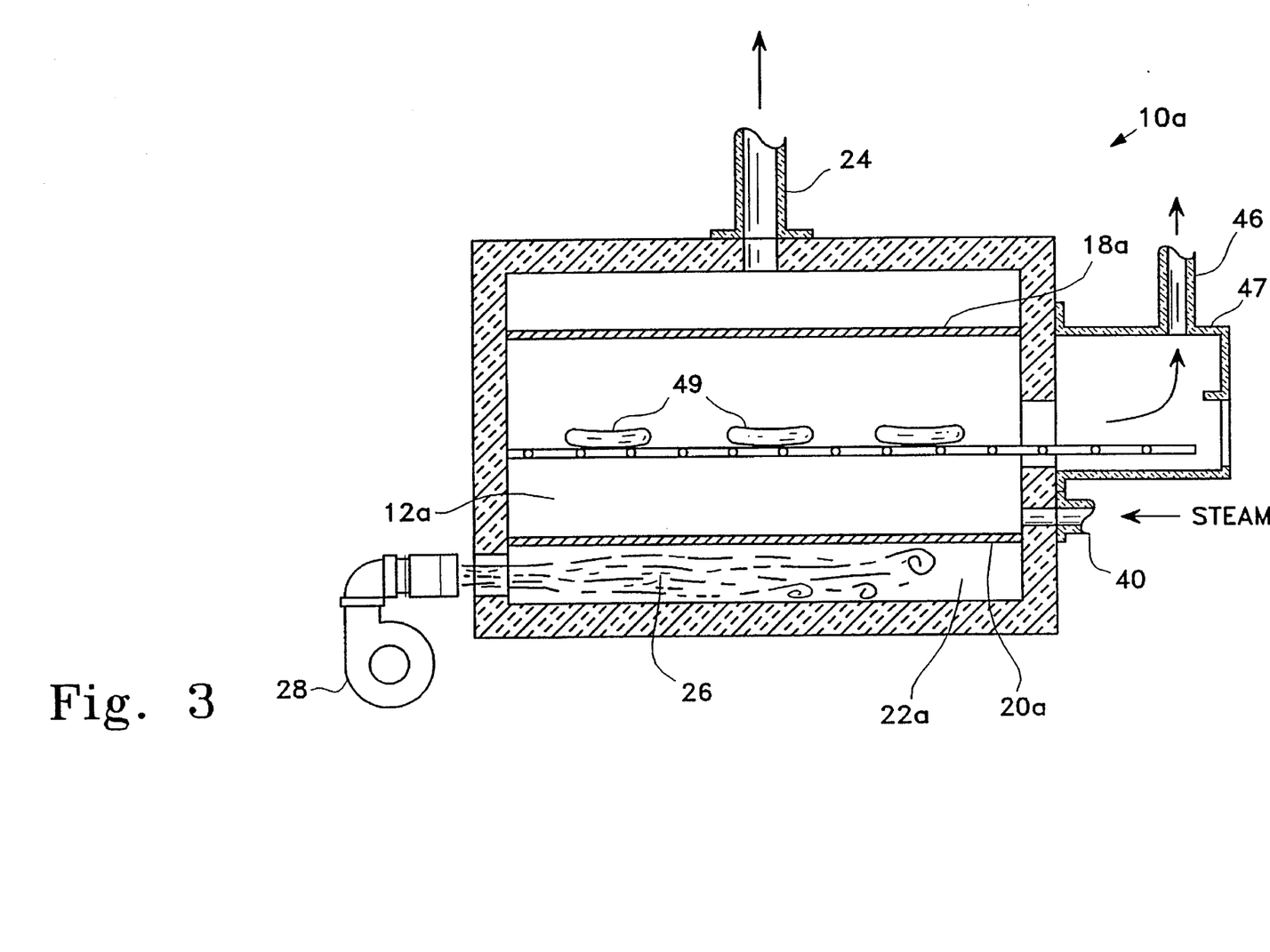
FIG. 3 is a view showing a modified embodiment of the oven of FIG. 1.

Such a simplified, static cooking oven, shown schematically at 10a in FIG. 3, can be used for domestic purposes, and could replace, for example, a backyard barbecue if operated at two stages of temperature. FIG. 3 shows the oven 10a as having an oven chamber 12a, which is shaped similarly to the chamber described relative to other embodiments, i.e. preferably a cylindrical oven wall 18a providing a surrounding radiant wall and defining the oven chamber. The gas burner 28 directs a flame 26 into the plenum 22a, preferably at the bottom of the plenum as indicated, so that the hot gases from the flame surround the radiant wall 18a within the plenum, the gases being exhausted from the plenum at a vent 24. Steam is injected at 40, into the oven chamber, in the manner described previously. In this form of the oven the steam and other oven gases are exhausted at a stack 46, via an opening vestibule or hood 47. A lower flow rate of steam injection into the oven normally will be required in this embodiment, since the oven is not open at both ends as in a conveyorized oven. The steam injection maintains a slightly positive pressure in the oven, substantially preventing air from entering at the vestibule 47. Some air may enter, but such air is not sufficient to support flaming in the oven.

The oven 10a can be operated at different temperatures. For browning, at about 1450° F., the radiant wall 12a will brown the food products 49 within the oven while also incinerating fats, oils, etc. rendered from the products. At a lower temperature, e.g. about 300° to 800° F., the products 49 can be fully cooked. In this case the renderings from the food products will not be incinerated but still will not flame because of the oxygen-deficient atmosphere from the steam injection. The oven wall will become dirty from the smoke, oil and particles, but will be "self-cleaned" each time the oven 10a is used at the higher temperature (e.g. about 1450° F.), with or without steam introduced; without steam, combustion of these materials will occur. Steam can be generated using exhausted heat from the plenum 12a.

Figure 2:
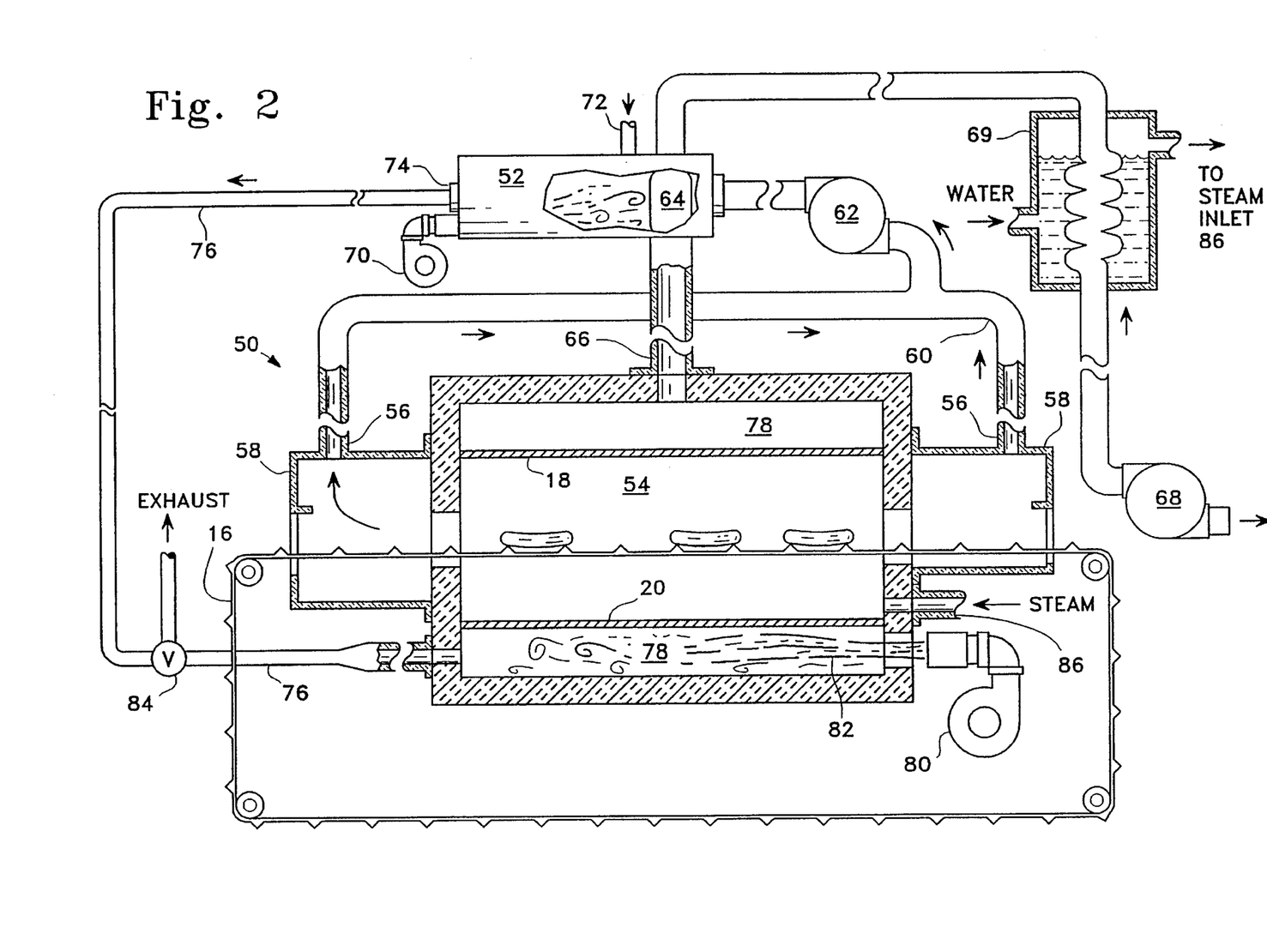
FIG. 2 is a schematic representation similar to FIG. 1 but showing another embodiment of the invention, wherein an external combustion chamber is connected to the radiant wall oven.

FIG. 2 shows a similar radiant wall oven 50 according to the invention, but in this case having connected to it a separate combustion chamber or incinerator 52 which completely burns rendered fats, oils, crumbs and other particles withdrawn from the oven chamber 54. As shown in the drawing, a pair of vents 56 with hoods 58 at the inlet and outlet of the oven chamber 54 withdraw oven atmosphere continually and feed the withdrawn gases and particles through a line indicated at 60, via a blower or fan 62, to a preheat exchanger 64 connected to the incinerating combustion chamber 52. Here the withdrawn oven atmosphere, which has a relatively low temperature (depending on the operating temperature of the oven's radiant walls 18 and 20), is preheated in the heat exchanger 64 by exchange with exhausted plenum gases withdrawn through a vent or stack 66 by a fan 68. This utilizes much of the heat from the higher-temperature plenum gases, so that the preheated oven gases are closer to combustion temperature when they enter the incinerator 52. Excess heat can be used to generate steam using a heat exchanger 69. A burner 70 in the combustion chamber 52 ignites the oven gases, with rendered oils, fats and other combustible particles at a temperature of about 1400° to 1500° F., at which they are completely incinerated and turned to ash. The combustible oils, fats and other particles can serve as part of the fuel in the burning process, which is supported by air introduced into the incinerator at 72.

The resulting gases then exit the incinerator at 74, and as indicated by the conduit line 76, are introduced into the plenum 78 of the oven 50. These high temperature gases thus help supply heat to the walls 18 and 20 in the plenum, to heat the walls to the desired temperature. One or more burners 80 are also included to direct a flame 82 into the plenum to heat the back sides of the radiant walls 18 and 20, but these burners are not always needed if a relatively low temperature cooking is taking place within the oven chamber 54. Also, the flow rate of the hot incinerator exhaust put through the heat plenum 78 can be regulated to less than 100%, via a valve 84 which can vent an unneeded portion of the cleaned, hot gases into the atmosphere. Automatic controls (not shown) can be used to effect this adjustment and produce the desired oven wall temperature.

As in the oven apparatus 10 of FIG. 1, a conveyor 16 is also shown in FIG. 2, for continuously moving food products through the oven chamber. Steam is introduced into the oven chamber 54 as indicated at 86. If desired for specific applications the oven system 50 could comprise a static, batch-process oven.

If the oven chamber 54 is operated at a moderate temperature such as 800° F. or less to fully cook food products, and those products contain renderable fats, oils, crumbs or other particles, the incinerator or combustion chamber 52 is needed to dispose of the resulting cooking by-product materials. They will not be incinerated in the oven chamber 54, since the wall temperatures are not high enough, and considerable smoke will be generated in the chamber and exhausted through the vents 56. The temperature of the oven exhaust in this case is relatively low, but this is increased somewhat by heat exchange with the plenum exhaust in the exchanger 64. The oven atmosphere gases are incinerated in the combustion chamber 52 at about 1400° to 1500° F. as explained above, and are then introduced into the plenum 78. At this point the gases have been cleaned sufficiently to be exhausted to atmosphere, and in the plenum they are mixed with combustion gases from the burner 80 and then exhausted through the stack 66, through the heat exchanger 64 and to the atmosphere. The hot gases may first be passed through a heat exchanger such as the exchanger 69 to produce steam from water, to be used at the steam injection port 86.

Figure 4:
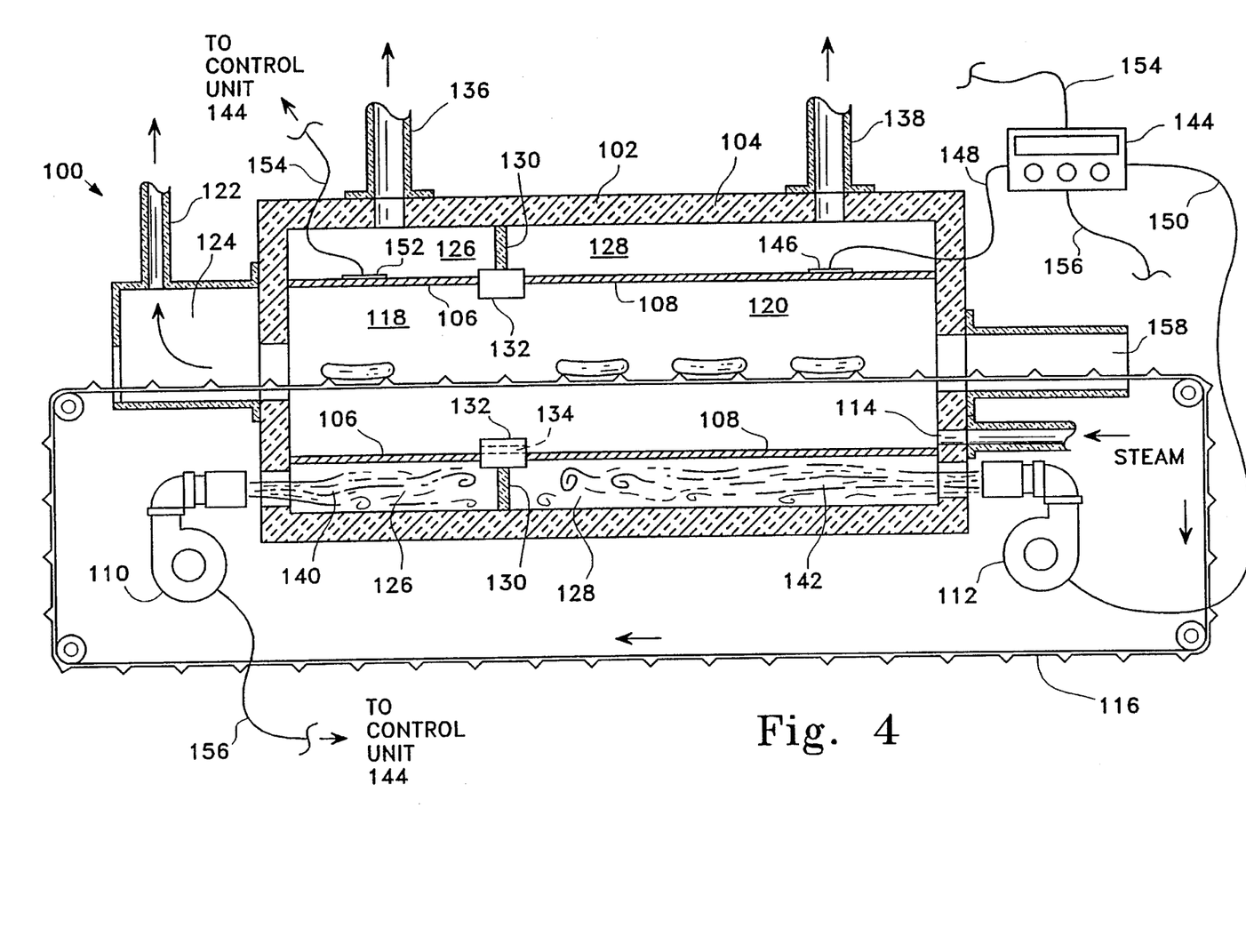
FIG. 4 is another schematic diagram showing an oven of the invention, in this case being a combined high-temperature and lower temperature oven.

FIG. 4 shows another embodiment of the invention which employs the same principles of radiant wall cooking but which has the advantages of being able to brown and cook a food product in a single cycle, on a single conveyor path. The oven 100 shown in FIG. 4 again has a housing 102 with insulation 104, and oven chamber walls 106 and 108. As above, these are preferably cylindrical, circular-cylindrical, elliptical-cylindrical or other shapes wherein the radiant wall 106 or 108 preferably has continuity around its periphery. Gas burners are shown at 110 and 112, with steam being injected at 114. A conveyor 116 moves food products through the oven from left to right in the embodiment illustrated.

An important feature of the oven 100 of FIG. 4 is that it has essentially two stages of cooking while still being a continuous process, fed by the conveyor 116. Browning is accomplished in a first oven chamber 118, then full cooking occurs in an adjacent chamber 120, although the direction of the conveyor could be reversed to cook the product before the high temperature browning. However, it is normally advantageous with most commercial cooking, wherein the product is frozen or cold before entering the oven, to first brown the food product in the chamber 118. This effectively browns the surface without breaking down internal fats, oils and moisture. Then the slower, lower temperature full cooking takes place in the chamber 120, and the overall loss of these fats, oils and moisture is far less than if the product were first heated to, say, 120° F. internally in the cooking oven 120 and then subjected to the very high temperature radiant walls in the chamber 118 for the browning characteristics.

The oven 100 in FIG. 4 is configured to accomplish lower temperature cooking in the oven 120, e.g. about 500° to 750° F., which with meat, poultry or other fatty products will produce considerable smoke, drippings and particulate material. The two-stage oven 100 enables these rendered fats and smoke to be incinerated in the higher temperature chamber 118, via the radiant walls 106 which preferably are at about 1400° to 1500° F. This is accomplished by locating a vent 122 and vent vestibule 124 only at the end of the unit which is adjacent to the higher temperature chamber 118. Thus, the movement of gases is always to the left as seen in FIG. 4, and smoke and combustible gases generated in the lower temperature chamber 120 are drawn through the high temperature chamber 118, incinerated to effectively clean them, and then are exhausted through the exhaust vent 122. This can eliminate the need for an external combustion chamber or incinerator 52 as shown in FIG. 2.

Although the oven chamber walls 106 and 108 could be one continuous wall (such as of stainless steel, as above) without division between heat plena 126 and 128 and relying on a gradation of temperature down from left to right in the figure, these plena preferably are separated into discrete areas as shown by a divider wall 130 in the drawing. This enables better control of the temperatures in each of the two oven chambers 188 and 120, i.e. within the incinerating range and within the full cooking range, respectively. Baffles or other heat sink devices (not shown) can be included in the plena 126 and 128, connected to the outside of the radiant walls, to assist in the transfer of heat into the walls 106 and 108.

As noted above relative to the oven of FIG. 2, the lower temperature cooking oven chamber 120 in FIG. 4 has the capability of self-cleaning. After a period of use for cooking greasy food products, the temperature of the radiant wall 108 in the chamber 120 can be elevated to about 1000°, or whatever temperature is sufficient to clean all of the particular residues or tars, varnish or other rendered products which have adhered to the walls of the chamber. Also, the oven apparatus 100 can be used at a slightly tilted attitude, with the right end as seen in FIG. 4 elevated above the left end. This will induce rendered fats and oils to flow downward into the incinerating chamber 118. A divider wall frame or flange 132 shown in the drawing may have a slot or hole indicated by a dashed line 134 for this purpose. The divider wall flange or collar 132 can extend farther into the oven, closer to the conveyor 116 if desired for greater isolation between the two oven chambers 118 and 120.

Exhaust from the high temperature plenum 126 is shown at an exhaust stack 136. For the other chamber, the lower temperature plenum 122 is exhausted via a stack schematically indicated at 138. The volume of exhaust is relatively low from each plenum, since essentially only a volume equal to the air portion of the gas-air mixture entering the plenum 126 via the flame shown at 140, and the plenum 128 via the flame 142, need be exhausted. As described previously, the heat from the high-temperature exhaust can be used to heat the lower-temperature plenum 128 (arrangement not shown), by feeding the exhaust at 136 into the plenum 128; also, any excess heat exhausted from the oven at 100 or from the plenum exhaust 138 can be used to generate steam to be injected at the steam entrance 114.

Controls for the oven apparatus 100 are schematically indicated in FIG. 4. A control unit 144 is connected to a temperature sensor 146 on the wall of the lower temperature cooking oven, via a wire or thermocouple 148. This controls the burner 112 via a connection 150. Similarly, a sensor 152 is located on the exterior of the chamber wall 106 in the high temperature plenum, connected by a connection 154 (shown broken) to the control unit 144. The burner 110 is connected to the unit 144 via a line 156 (also shown broken).

The oven exhaust vent 122 is controlled by a withdrawal fan and/or damping (not shown). This is needed to "tune" the system such that the correct amount of gas flow is drawn to the left as seen in FIG. 4, through the incinerating oven area 118. It is important that this draw not be too great since, in a continuous flow conveyorized oven as indicated, the conveyor exit side will have an opening 158, and little or no air should be drawn in this opening, to prevent flaming inside the oven chambers. The withdrawal rate through the vent 122 is also balanced against the volume flow rate of steam injected at 114, so that there is preferably a balanced situation at the conveyor exit opening 158 whereby the steam atmosphere holds back any air from coming into the oven at that end.

Figure 5:
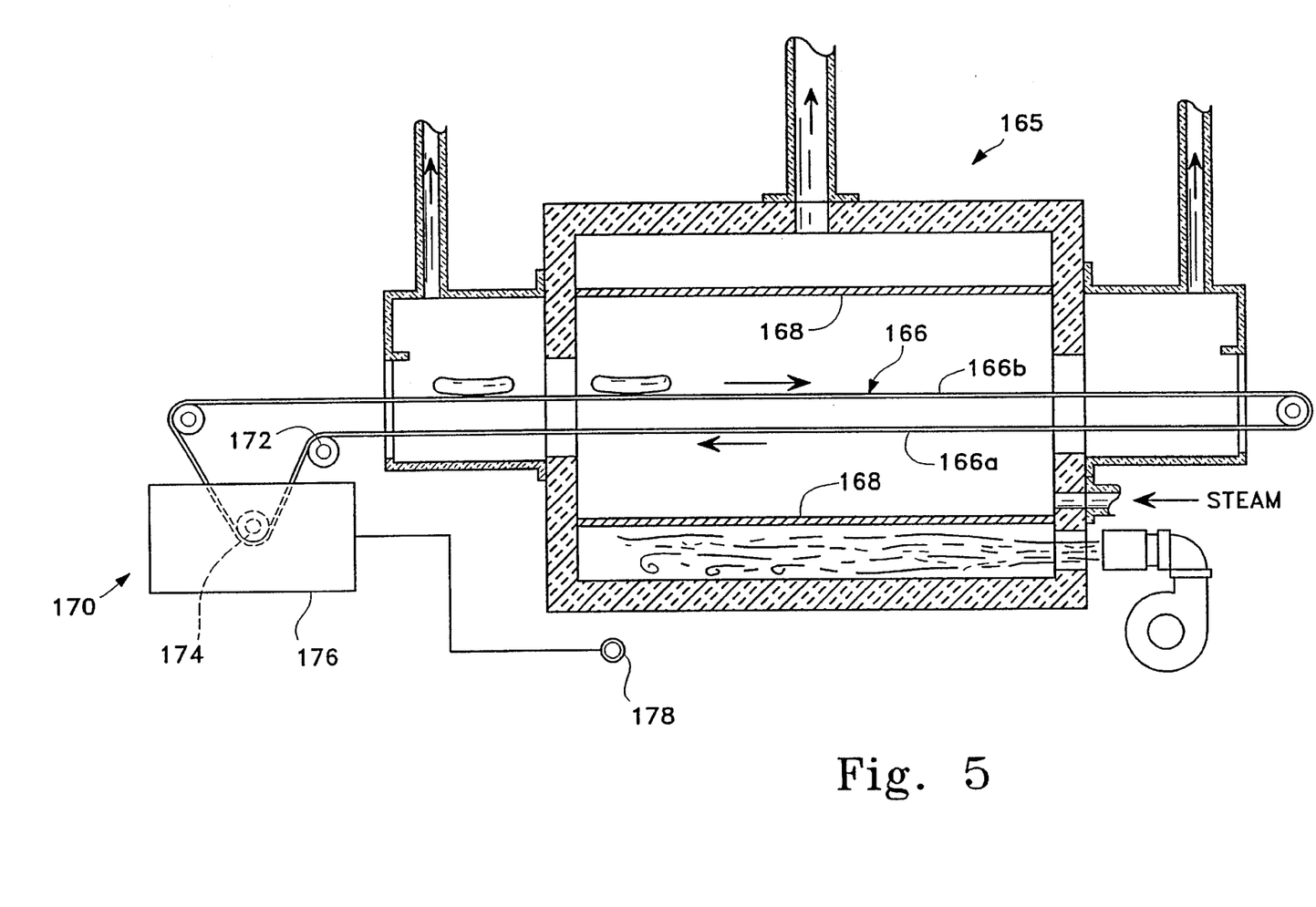
FIG. 5 is a schematic side elevation view showing a radiant wall oven of the invention, similar to some of the embodiments described above but with a conveyor which returns through the oven.

FIG. 5 schematically illustrates a further embodiment of the invention. The radiant wall oven 165 shown in FIG. 5 can be considered a modification of the unit 10 shown in FIG. 1. The radiant wall oven of FIG. 5 is useful for producing branding or grill marks on products such as hamburger patties, pork patties, sausages, chicken patties and parts, steaks, chops, fish, etc. A conveyor 166 for the oven returns through the oven itself, rather than returning outside as shown in FIGS. 1, 2 and 4. Thus, the metal conveyor 166 accumulates enough heat to be at a temperature appropriate for grill striping the food products. Such a temperature is generally in the range of about 600° to 800° F.; generally 600° to 700° is sufficient, depending on the product, its input temperature and dwell time on the conveyor.

The belt 166 comprises an open mesh or a series of metal rods, preferably stainless steel and preferably about 50% to 60% open. There will be some shadowing by the return portion 166a of the belt, which is positioned between the lower part of the radiant wall 168 and the upper, working flight 166b of the conveyor. However, if the belt is sufficiently open, the movement of the return portion 166a minimizes shadowing and prevents any specific effects of shadowing.

Since the radiant wall 168 of the oven is at a high temperature such as described above (1000° to 1500° F., preferably about 1450° F.), the belt 166 may attain too high a temperature, well over 1000°, and this would in most cases cause objectionable burning at the grill stripes. For this purpose, a temperature control apparatus 170 is included in a preferred embodiment. The apparatus 170, shown schematically, includes rollers 172 and 174 for conveying the belt through a cooling vessel or area 176. The cooling area 176 can include cool air directed over the belt, or more preferably, a water spray. The temperature and intensity of water spray (or air or other cooling fluid, not shown) can be controlled by a manual control 178. This can adjust the flow of a water spray or other cooling device, and it can be "tuned" by an operator so as to achieve the desired temperature for the grill striping desired, or it can include a belt temperature sensor and a thermostat (not shown), so that a specific target temperature for grill striping can be manually set.

The temperature range of the belt for grill striping is important in another sense, in that if the belt is too hot and also if it is too cool, it can stick to the product, damaging the surface of the product.

Figure 6:
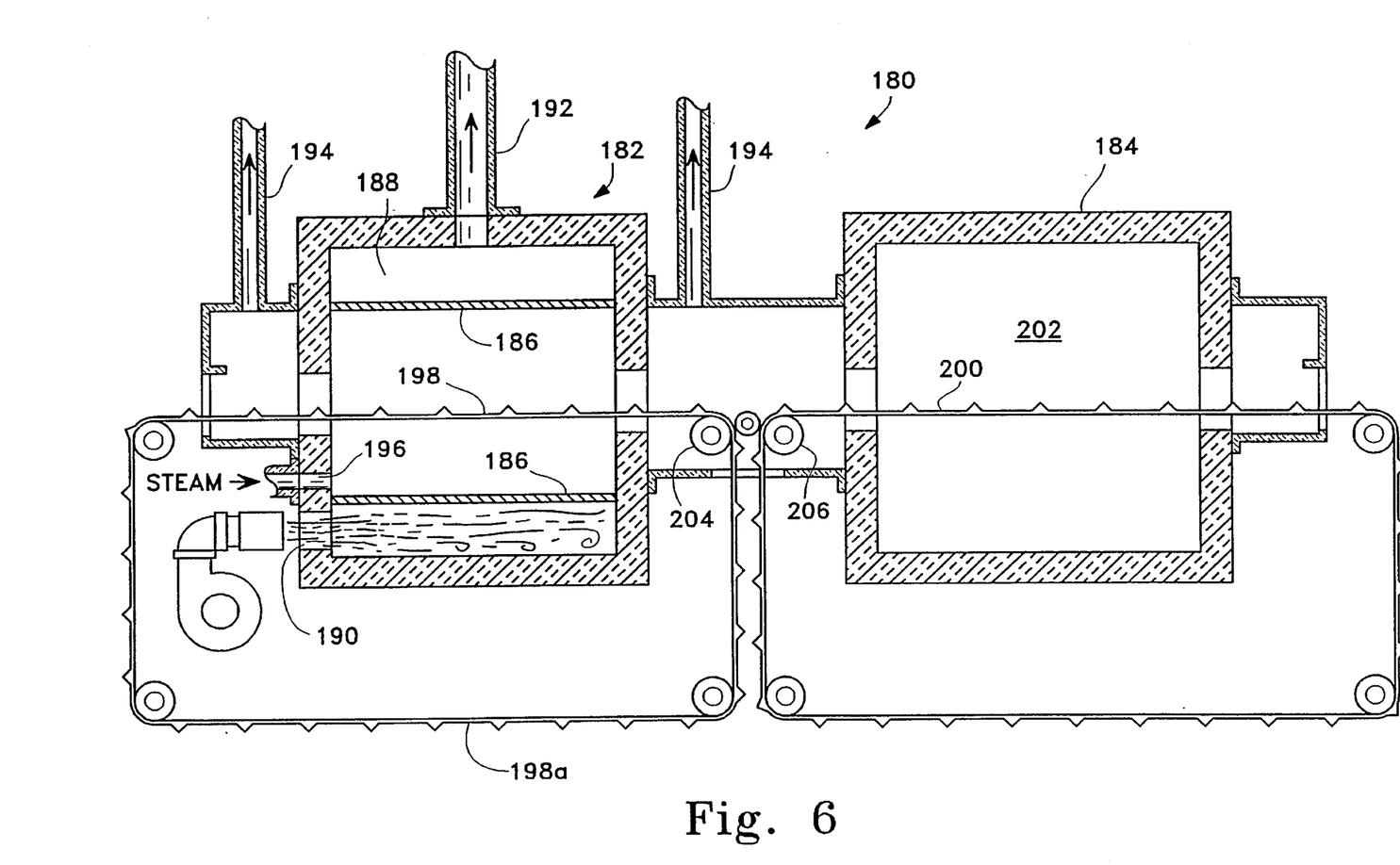
FIG. 6 is another schematic view, showing a compound oven arrangement which includes a radiant wall oven and a microwave oven, for browning and cooking food products in succession.

FIG. 6 is another schematic view showing a cooking system 180 according to the invention, comprising a combination of a radiant wall oven 182 and a microwave oven 184. The radiant wall oven 182 is constructed generally as in embodiments described above with a radiant wall 186, a heated plenum 188 behind the wall 186, which may be heated by a gas burner 190, plenum exhaust 192 and oven exhaust 194. Steam or other non-combustible gas is injected at 196. A conveyor 198 is shown with a return portion 198a outside the oven; however, if grill striping is desired on products, as discussed above, the metal belt 198 can be returned through the oven chamber itself, with appropriate temperature control as also explained above. The operating temperature and other parameters of the oven 182 are preferably as described above. The radiant wall oven 182 effects a browning of the food products, with full cooking achieved by the microwave oven 184. It should be understood that although the order of cooking/browning will ordinarily be browning first in the radiant wall oven 182, then full cooking in the microwave oven 184, these steps can be accomplished in the reverse order. In commercial or industrial cooking, it is usually important to conduct the browning first, to maintain the yield of the product. If cooking is accomplished first, then the product is already hot when entering the browner, and the product will often release too much volume of juices, materially reducing yield.

It is emphasized, however, that in some cases or applications the cook step can be performed first. For on-site cooking (such as in franchise food outlets), where yield is not so important, it may sometimes be desirable to perform the microwave cooking step first. In many cases where the food product has been frozen, it is important to do the browning step first in order to assure that the browning effect is limited to the outside of the product, with little penetration.

In the case of a microwave oven 184, a conventional metal conveyor belt cannot be used. Thus, FIG. 6 shows a separate conveyor 200 passing through the internal chamber 202 of the microwave oven. Such a conveyor is typically of plastic materials, as is known in the commercial microwave industry. In the usual case wherein browning is accomplished first, the metal conveyor 198 from the radiant wall oven 182 passes adjacent to the conveyor 200, at respective rollers 204 and 206. Food products are transferred between the belts 198 and 200, and conventional belt transfer apparatus may be needed for this purpose, such as rollers positioned between the two belts.

Microwave cooking has assumed an important position in commercial cooking and in the food service industry. In many applications microwave cooking can require one-third, one-fourth or less the space of conventional cooking such as hot air convection systems often used in commercial applications. For purposes of the present invention, it is estimated that the radiant wall oven 182 can effect the browning (and grill striping, if desired) of meat, chicken and other products in about thirty seconds. The microwave cooking is estimated to require up to an additional 30 seconds, depending on power, but it may be accomplished in far less time, even under ten seconds in some circumstances. It is therefore seen that full browning, with grill striping if desired, and cooking of a food product such as meat, poultry, fish, sausage, etc. can be accomplished in less than one minute, with the product still exhibiting very good aesthetic qualities and being cooked as desired. The space required by the combination cooking system 180 shown in FIG. 6 is far less, e.g. 75% less, than any conventional cooking/browning system (the browning oven 182 may be, for example, ten feet or less in length, and the microwave oven 184 may occupy an additional ten feet). Further, the microwave and radiant wall ovens cooperate in two very important ways, in that both processes exhaust little or no smoke or environmentally objectionable gases into the atmosphere, and both ovens require very little cleaning. Cleaning and sanitation can be reduced by 90% in labor and chemicals.

As mentioned above, the radiant wall ovens, although preferably utilizing liquid or gas fuels, can instead incorporate a thin ceramic shell as the wall, with encased high-temperature resistance elements. The wall is backed by insulation, but without the need for a heat plenum as in the fuel-burning embodiments. Such an electrical resistance oven is similar to what is shown in FIGS. 1 and 3–6, but does not include the heating plenum (e.g. 22 in FIG. 1) with no need for any plenum exhaust. The inclusion of electrical heating elements in a ceramic wall is known for other purposes; particularly in electrical drying equipment with lower temperature heating elements embedded in ceramic.

The above described preferred embodiments are intended to illustrate the principles of the invention but without limiting its scope. Other embodiments and variations to these preferred embodiments will be apparent to those skilled in the art and may be made without departing from the essence and scope of the invention as defined in the claims.

We claim:

1. A method for cooking a food product, comprising:

placing the food product in an oven chamber having heated, radiant walls, with the food product spaced from the walls, maintaining the radiant walls at a temperature at least sufficient to cook the food product, retaining the food product in the oven chamber and subjected to the heat from the radiant walls for a dwell time sufficient to brown the surfaces of the food product, but not sufficient to burn the exterior surfaces, and introducing and maintaining an oxygen-deficient atmosphere in the oven chamber, low enough in oxygen that the food product does not flame while in the oven chamber.

2. The method of claim 1, wherein the step of retaining the food product in the oven chamber comprises conveying food products through the oven chamber continuously on a conveyor, at a rate selected to provide a desired dwell time in the oven chamber.

3. The method of claim 2, including conveying the food products through a two-stage oven chamber, one stage being at a temperature sufficiently high to incinerate all rendered materials from the food product while browning the surfaces of the food product, with a dwell time insufficient to fully cook the food product, and the other stage being at a lower temperature at which the food product is fully cooked, and including constantly moving the oven atmosphere in a direction from the lower temperature chamber to the higher temperature chamber and exhausting the atmosphere from the higher temperature chamber, so that rendered materials entering the oven atmosphere in the lower temperature chamber are incinerated in the higher temperature chamber.

4. The method of claim 3, including moving the conveyor in such a direction that the food product is conveyed through the higher temperature chamber first, then through the lower temperature chamber.

5. The method of claim 1, wherein the food product is thick enough that its interior is not fully cooked by the radiant wall oven, and including the further step of cooking the food product separately at a lower temperature.

6. The method of claim 1, wherein the radiant walls of the oven are maintained at a temperature between about 1400° F. and 1500° F.

7. The method of claim 1, further including the steps of constantly withdrawing a part of the atmosphere from the oven chamber including products released into the oven atmosphere from the browning of the food product, incinerating the withdrawn portion of the atmosphere in an incinerating combustion chamber, along with makeup air, and introducing the heated air and other gases from the combustion chamber into a plenum behind the radiant walls of the oven, to thereby heat the radiant walls.

8. The method of claim 7, further including heating the radiant walls by directing a flame against the back sides of said walls in the plenum.

9. The method of claim 1, further including heating the radiant walls by directing a flame against the back sides of said walls in a plenum behind the radiant walls.

10. The method of claim 7, further including preheating said withdrawn portion of the oven atmosphere prior to its introduction into the incinerating combustion chamber, by heat exchange with hot exhaust which has passed through the plenum behind the radiant walls of the oven.

11. The method of claim 1, wherein the temperature of the radiant walls is about 1400° to 1500° F., and wherein the food product is sufficiently thin that it is fully cooked by its dwell time in the radiant wall oven.

12. The method of claim 1, wherein the temperature of the radiant walls is about 1400° to 1500° F., and including incinerating essentially all rendered and dropped materials from the food product in the oxygen-deficient atmosphere and exhausting gases from the oven chamber to the outside atmosphere.

13. A method for cooking a food product by radiant energy, comprising:

moving the food product on a conveyor through a cooking oven chamber which includes heated walls giving off radiant heat toward the food product, the temperature of the heated walls and the dwell time of the food product in the oven chamber being such in combination to fully cook the food product, introducing and maintaining an oxygen-deficient atmosphere in the oven, low enough in oxygen that the food product does not flame while cooking in the oven chamber, and constantly withdrawing at least a portion of the oven atmosphere from the oven chamber.

14. The method of claim 13, further including introducing the withdrawn portion of the oven atmosphere to an incinerating combustion chamber, and incinerating products given off in cooking from the food product by combustion in the combustion chamber, and conducting hot exhaust from the combustion chamber through a heat plenum behind each heated oven wall of the oven to thereby heat the oven walls.

15. The method of claim 13, wherein the oven chamber is a two-stage chamber, including a first oven chamber comprising a browning chamber having heated walls of sufficient temperature as to brown the surfaces of the food product but not sufficient to fully cook the food product during the dwell time in the browning chamber, and the method including moving the food product on the conveyor first through the browning chamber, then continuing moving the product on the conveyor through a cooking oven chamber, which serves as a second oven chamber.

16. The method of claim 15, wherein the step of constantly withdrawing at least a portion of the oven atmosphere comprises constantly moving the oven atmosphere in a direction from the cooking oven chamber to the browning chamber, where rendered particles in the atmosphere are incinerated, and exhausting the oven atmosphere from the browning chamber.

17. The method of claim 13, including the step of maintaining the heated oven walls at a temperature between about 800° and 900° F.

18. The method of claim 14, wherein the food product is of a type which gives off rendered fats, oils and other combustible products when heated in the oven chamber, and including burning such rendered combustible products in the combustion chamber as fuel, supporting the combustion and adding to the heat in the combustion chamber.

19. The method of claim 13, wherein the food product comprises meat.

20. The method of claim 14, wherein the temperature of the heated makeup air and other gases exiting the incinerating combustion chamber is in the range of about 1400° to 1500° F.

21. The method of claim 14, further including the step of preheating the withdrawn portion of the oven chamber atmosphere by heat exchange with exhaust gases from the plenum associated with the heated walls.

22. The method of claim 14, further including producing steam using heat from the combustion chamber and introducing the steam to the oven chamber to produce the oxygen deficient atmosphere.

23. The method of claim 1, wherein the step of retaining the food product in the oven chamber comprises conveying food products through the oven chamber continuously on a conveyor, at a rate selected to provide a desired dwell time in the oven chamber, and further including the step of returning the conveyor, devoid of food products, through the oven chamber and thereby heating the conveyor to a temperature sufficient to place grill marks on the food products.

24. The method of claim 23, further including controlling the temperature of the conveyor by cooling the conveyor.

25. The method of claim 24, wherein the conveyor when conveying food products is maintained in a temperature range of about 600° to 800° F.

26. The method of claim 1, wherein the radiant walls of the oven are maintained at a temperature sufficient, within said dwell time, to brown the surfaces of the food product without fully cooking the food product, and including the further step of cooking the food separately in a microwave oven.

27. The method of claim 26, wherein the step of retaining the food product in the oven chamber comprises conveying food products through the oven chamber continuously on a conveyor, at a rate selected to provide said dwell time sufficient to brown the surfaces of the food product.

28. The method of claim 26, wherein the radiant walls of the oven chamber are maintained at a temperature between about 1400° F. and 1500° F.

29. An oven for cooking food products using radiant wall heat, comprising:

a housing defining an oven chamber with walls, means for heating said walls from outside the oven chamber, flame retardant means for maintaining an oxygen-starved atmosphere in the oven chamber, to prevent flaming of food products or materials rendered from the food products when cooked in the oven chamber, and exhaust means for withdrawing gases from the oven atmosphere during cooking ok food products.

30. The oven of claim 29, wherein the flame retardant means comprises means for introducing steam into the oven atmosphere.

31. The oven of claim 30, wherein the means for heating the walls comprises a plenum behind the walls and fuel burner means within the plenum for burning fuel in the plenum, and further including neat exchanger means outside the oven housing, with water conducting coils and means for using gases from the plenum to neat the water coils and generate steam which is fed to the flame retardant means to produce said oxygen-starved atmosphere.

32. The oven of claim 29, further including food product conveyor means for continuously moving food products through the oven chamber.

33. The oven of claim 32, wherein the radiant walls of the oven have a temperature of about 1400° F. to 1500° F., sufficiently high to brown the surfaces of the food products and to incinerate rendered materials injected into the oven atmosphere from the food products, said conveyor means having an operating speed sufficient to avoid full cooking of the food products while allowing browning of the food products.

34. The oven of claim 33, further including microwave cooking means adjacent to said oven chamber, with means for moving the food products through the microwave cooking means to gully cook the food products.

35. The oven of claim 34, wherein the microwave cooking means is positioned downstream of the oven chamber, said means for moving the food products including means for receiving the food products from the oven chamber after they have been browned in the oven chamber, whereby the food products are fully cooked after they have been browned.

36. The oven of claim 35, wherein the conveyor means in said oven chamber comprises a metal conveyor belt, and wherein the microwave cooking means comprises a microwave oven adjacent to said oven chamber, with plastic conveyor means for receiving food products conveyed by said conveyor means from said oven chamber.

37. The oven of claim 29, further including an incinerating combustion chamber external to the housing and oven chamber, and means for conducting gases withdrawn by said exhaust means from the oven atmosphere into the incinerating combustion chamber to be incinerated therein.

38. The oven of claim 37, wherein each heated radiant wall of the oven has a temperature of about 500° F. to 800° F.

39. The oven of claim 37, wherein the flame retardant means comprises means for introducing steam into the oven chamber during cooking of food products, and including heat exchange means for utilizing heat exhausted from the incinerating combustion chamber to convert water into steam for introduction into the oven chamber.

40. The oven of claim 32, wherein the oven chamber comprises a pair of adjacent, successive chambers along a path of the conveyor means, including a browning oven chamber having walls of sufficiently high temperature to incinerate rendered materials injected into the oven atmosphere from the food products, and a cooking oven chamber at a lower temperature, insufficient to incinerate rendered materials, and wherein the relative lengths of the browning chamber and the cooking chamber are such that, at the speed of movement of the conveyor means, the food products are only surface-browned in the browning oven chamber and are fully cooked in the cooking oven chamber.

41. The oven of claim 40, further including means for continually moving the oven atmosphere in a direction from the cooking oven chamber toward the browning oven chamber and to the exhaust means, whereby rendered materials entering the atmosphere in the cooking oven chamber are incinerated in the browning oven chamber before being exhausted.

42. The oven of claim 41, wherein the browning oven chamber is positioned before the cooking oven chamber along the path of the conveyor means.

43. The oven of claim 29, wherein the means for heating the walls of the oven comprises the walls being of a ceramic material with embedded nigh-temperature electric resistance elements.

44. A cooking system for browning and cooking food products, comprising:

a browning oven for browning the surfaces of food products, including a housing defining an oven chamber with walls, the walls having heating means for nearing the walls to impart radiant energy into the oven chamber, flame retardant means for maintaining an oxygen-starved atmosphere in the oven chamber, to prevent flaming of food products or materials rendered from the food products when heated in the oven chamber, and exhaust means for withdrawing gases from the oven atmosphere during browning of food products, a cooking oven, including microwave cooking means for fully cooking the food product by microwave radiation, and means for moving food products through both ovens and for transferring food products between ovens so that the food products are fully cooked and surface-browned.

45. The cooking system of claim 44, wherein the browning oven is positioned in advance of the cooking oven so that food products are first surface-browned, then cooked.

46. The cooking system of claim 44, wherein the walls of the oven chamber have a temperature of about 1400° to 1500° F., sufficiently high to brown the surfaces of the food products and to incinerate rendered materials injected into the oven atmosphere from the food products, for a preselected dwell time of the food products in the browning oven.

47. A method for browning and fully cooking food products, comprising:

placing the food product in an oven chamber having heated, radiant walls, with the food product spaced from the walls, maintaining the radiant walls of the oven chamber at a temperature sufficient, for a preselected dwell time of the food product in the oven chamber, to brown the surfaces of the food product without fully cooking the food product, retaining the food product in the oven chamber for said preselected dwell time, introducing and maintaining an oxygen-deficient atmosphere in the oven chamber, low enough in oxygen that the food product does not flame while in the oven chamber, and fully cooking the food product separately in a microwave oven.

48. The method of claim 47, wherein the step of retaining the food product in the oven chamber comprises conveying food products through the oven chamber continuously on a conveyor, at a rate selected to provide said dwell time sufficient to brown the surfaces of the food product.

49. The method of claim 47, including maintaining the radiant walls of the oven chamber at a temperature between about 1400° and 1500° F.

50. The method of claim 47, wherein the step of cooking the food product in the microwave oven is performed after the food product has been Drowned by the radiant walls of said oven chamber.

51. The method of claim 50, including moving the food product continuously on conveyor means, first through said oven chamber and then through the microwave oven.

52. The method of claim 47, wherein the step of cooking the food product in the microwave oven is performed before the food product is browned by the radiant walls of said oven chamber.

53. The method of claim 47, including browning and fully cooking the food product in less than one minute.

* * * * *